April 5, 1966      A. M. SEVERDIA      3,244,034
LOCKING AND RETAINING SLIP REMOVABLE BUSHINGS
Filed Nov. 19, 1963
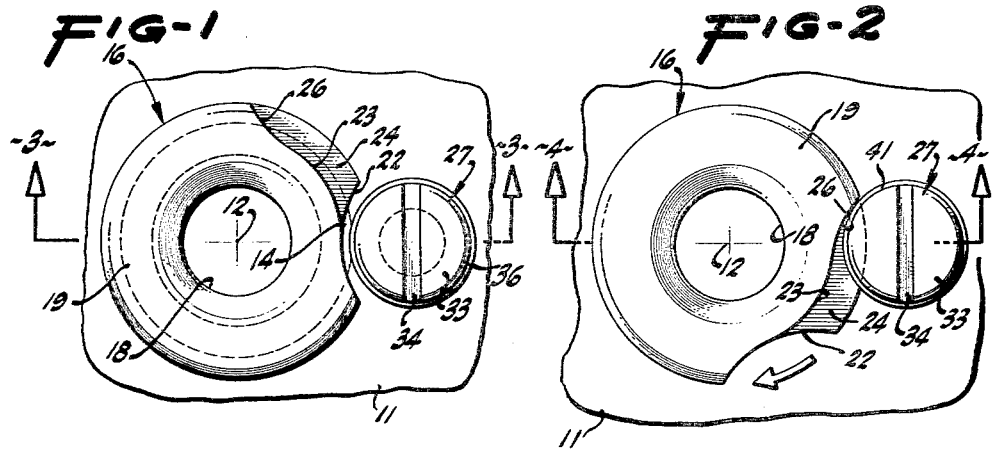
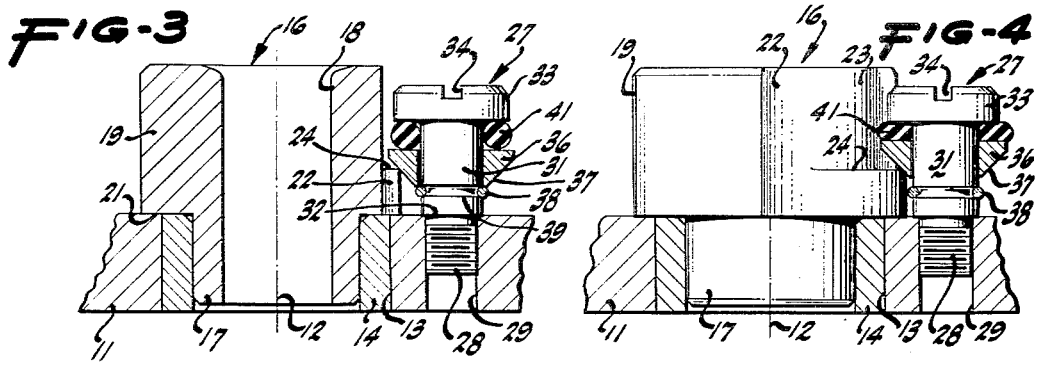
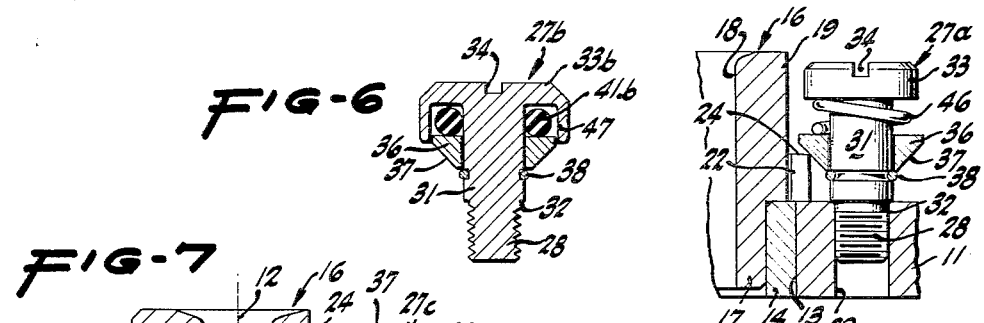
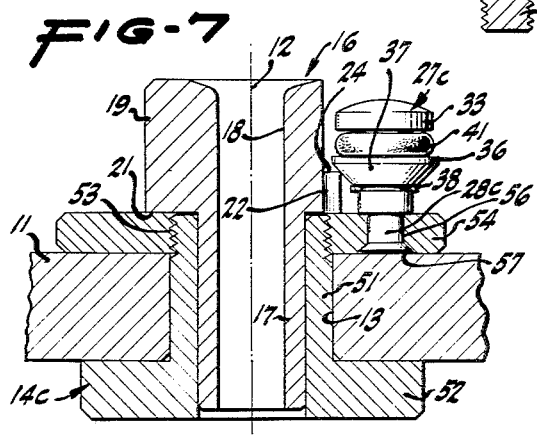
INVENTOR.
ANTON M. SEVERDIA
BY
ATTORNEYS

United States Patent Office 3,244,034
Patented Apr. 5, 1966

3,244,034
LOCKING AND RETAINING SLIP
REMOVABLE BUSHINGS
Anton M. Severdia, 206 Wyndham Drive,
Portola Valley, Calif.
Filed Nov. 19, 1963, Ser. No. 324,721
16 Claims. (Cl. 77—62)

This invention relates to a new and improved locking and retaining snap-lock screw for slip removable bushings. More particularly, the invention relates to a device used by toolmakers wherein a liner is fitted into a jig and bushings having various inside diameters but a standard outside diameter are inserted in the liner. The hole in the bushing accommodates a variety of drills, reamers and other rotary tools.

Problems in the use of slip removable bushings involve insertion and removal thereof in a rapid manner, positive location in the liner, and more particularly means for retaining the bushing in the liner so that it is not unintentionally dislodged while the jig is being used, transported, or stored.

A feature of the present invention, contrasted with other devices of this general type, is the fact that the liner need not be specially constructed or machined in order to provide an inter-fitting surface or projection to hold the bushing in the liner.

Another important feature of the invention is the fact that there is provided a slip removable bushing having formed thereon a shoulder and there is further provided a snap-lock screw or stud which is attached to the jig adjacent the liner or to the liner, said screw having a bevelled, axially slidable washer thereon resiliently biased in a downward direction. The washer engages the bushing shoulder and holds the bushing in place in the liner against axial withdrawal and also applies sufficient friction force against rotation of the bushing to maintain it in the liner despite considerable vibration, inversion of the jig or other forces which might tend to turn the bushing so that its shoulder escapes from the lock screw and it is dislodged from the liner.

Other objects of the present invention will become apparent upon reading the following specification and referring to the accompanying drawings in which similar characters of reference represent corresponding parts in each of the several views.

In the drawings:

FIG. 1 is a plan view of a portion of the jig with the invention installed therein, showing the bushing prior to its being locked in place.

FIG. 2 is a view similar to FIG. 1 showing the bushing locked in place.

FIGS. 3 and 4 are respectively vertical sectional views taken along the lines 3—3 and 4—4 of FIGS. 1 and 2.

FIG. 5 is a fragmentary view similar to FIG. 3 of a modification of the lock screw.

FIG. 6 is a vertical sectional view through a further modified lock screw.

FIG. 7 is a view similar to FIG. 3 of still another modification.

In machine shop practice it is frequently necessary to perform drilling, reaming and other operations repetitively, and for such purpose drilling jigs are provided to which a workpiece is fastened, such jigs having holes therein which guide the drill, reamer or other tool. Because of wear, the holes usually are provided with hardened bushings or bushing liners which absorb the wear of the tools and locate the tools in proper position. Further, when different operations must be performed about the same center, it is desirable that the liner be provided with bushings which may be replaced, said bushings having different internal dimensions, to accommodate different diameters of drills, reamers and the like.

As illustrated in the accompanying drawings, there is provided a jig 11, here shown partially, it being understood that an ordinary jig is considerably larger than the portion herein illustrated and usually has a plurality of different hole locations rather than the single hole here illustrated. There is further provided means whereby a workpiece may be clamped thereto, preferably to the underside thereof. It will be assumed that repetitive machining operations of the nature of drilling, reaming and the like must be performed about a center line 12 as a central axis of rotation of the tool or tools. Accordingly, a hole 13 of enlarged outside diameter is drilled in jig 11 centered about axis 12. Inserted in hole 13 is a cylindrical liner 14 which fits in hole 13.

There is also provided a bushing 16 which has a reduced diameter lower portion 17, the outside diameter of which fits inside bushing 14 with a slip fit and thus accurately locates the central axis of bushing 16 relative to center line 12. The internal bore 18 of bushing 16 is precisely dimensioned to fit the size of the particular drill, reamer, etc. for which the bushing is designed. Thus it will be seen that the external diameter of lower portion 17 will be standard to fit a standard inside diameter of liner 14 but that the internal bore 18 will be precisely dimensioned for particular tools. A head 19 is formed above reduced diameter portion 17 and is preferably externally knurled. A shoulder 21 is thus provided at the lower end of head 19 which rests against the top surface of jig 11 or the top end of liner 14. The exterior of head 19 is generally circular in plan as viewed in FIGS. 1 and 2, except as follows: a cutout portion 22 extends from top to bottom of the head 19 in one location. As shown in the accompanying drawings, the cutout 22 is milled in the side of head 19 and is, therefore, of arcuate profile. Adjacent the cutout 22, a partial cut 23 is formed in the side of head 19 which extends from the top to a shoulder 24 which is spaced below the top of head 19 but above the elevation of shoulder 21. Shoulder 24 is preferably horizontal but may be slanted. The shoulder 24 terminates in an outwardly curved wall 26 displaced in a counter-clockwise direction from cutout 22 and thus the arcuate length of the shoulder may be about 60°.

Adjacent but spaced slightly to one side of liner 14 is a lock screw or stud 27 having a reduced diameter, threaded lower end 28 which is in threaded engagement with a tapped hole 29 in jig 11. Above the lower end 28 is an enlarged diameter stem 31, the juncture of end 28 and stem 31 providing shoulder 32 which is drawn tightly against the top surface of FIG. 11. Above stem 31 is head 33 which may be provided with a screw driver slot 34 or other means for tightening screw 27 in hole 29. Slidable on stem 31 in an axial direction is washer 36 having a bevelled or curved (radius) bottom surface 37. A retainer ring 38 is fitted into a shallow groove 39 in stem 31 to limit downward movement of washer 36. Above washer 36 and below head 33 is a resilient ring 41, such as an O-ring fitting around stem 31.

In use, the installation of the device is shown in FIGS. 1 and 3 wherein lock screw 27 is in place in jig plate 11 and resilient ring 41 is uncompressed—i.e. the washer 36 is biased against the retaining ring 38. The particular desired bushing 16 is inserted in liner 14 by slipping it vertically downwardly in the precise position shown in FIGS. 1 and 3—the cutout 22 facing screw 27 and thus providing clearance around screws 27 so that the shoulder 21 can seat against the top surface of plate 11. Thereafter bushing 16 is twisted approximately 60°, the knurled outer surface of head 19 facilitating this twisting clockwise 75° until shoulder 24 is facing screw 27. (See FIGS. 2 and 4.) During such twisting movement, the shoulder 24 engages under the bevelled surface 37 of washer 36 and raises the washer to the position shown in FIG. 4 thereby compressing resilient member 41 against head 33. Thereafter ring 41 exerts a downward force on washer 36 which prevents axial withdrawal and frictionally retards rotative movement of bushing 16.

FIG. 5 shows a modified lock screw 27a wherein the rubber O-ring type of resilient member 41 of FIGS. 1–4 is replaced by a coil or a diaphragm spring 46 interposed between the underside of head 33 and washer 36. The other elements are substantially the same as in FIGS. 1–4 and the same reference numerals are used.

FIG. 6 shows a further modified lock screw 27b wherein head 33b is formed with an annular, downwardly facing recess 47 in its underside having an inside diameter slightly greater than washer 36. Installed in recess 47 is resilient member 41b. The other elements are substantially the same as in the modification of FIGS. 1–4, and the same reference numerals are used.

FIG. 7 shows still a further modification, and employs a removable liner construction. Thus, fitting in hole 13 is the cylindrical portion 51 of liner 14c which has an enlarged bottom head 52 which fits against the underside of jig 11. The upper end of portion 51 is threaded as indicated by reference numeral 53 and surrounding the threaded portion is a thin nut 54 which is screwed tightly against the upper surface of jig 11. In this form of the invention, lock stud 27c may be threaded at its lower end but, as illustrated in FIG. 7, preferably is not thus threaded. A hole 56 is formed in nut 54 and a countersink 57 at its lower end. The end of the stem 28c of lock stud 27c is staked to hold the lock stud 27c in place. In other respects, the elements of the structure of FIG. 7 and their function are similar to the preceding modifications and the same reference numerals are used.

It will be apparent that, with the parts in the position of FIGS. 2 and 4, bushing 16 cannot be withdrawn. Further, friction of washer 36 on shoulder 24 restrains rotation of bushing 16. Hence the bushing remains in place despite considerable vibration, inversion, etc. However, when bushing 16 is to be removed, it can be turned counter-clockwise back to the position of FIGS. 1 and 3 and slipped upward.

What is claimed is:

1. A jig comprising an apertured plate, a liner in the aperture in said plate formed with a cylindrical bore, a removable bushing having a reduced outside diameter portion to fit in said liner with a slip fit and a head on one end of greater width than said reduced diameter portion, said head formed with an extended first groove of limited arcuate length and of a substantial depth in an axial direction from top to bottom, said head formed with an external second groove immediately adjacent said first groove and of limited arcuate length and a depth less than said first groove to provide a shoulder at the bottom of said second groove, and a lock member having a stem, means for securing said stem to said jig adjacent and fixed relative to said head, a washer axially slidable on said stem and having an oblique undersurface, resilient means biasing said washer in a downward direction, said shoulder being at the level of said oblique undersurface when said head is turned with said first groove facing said lock member, said undersurface being raised upward against the force of said resilient means when said head is turned with said shoulder facing said lock member, whereby said resilient means exerts pressure on said head to restrain rotative and axial movement of said removable bushing relative to said liner.

2. A jig according to claim 1, in which said liner is a tubular member of uniform inside and outside diameter throughout.

3. A jig according to claim 1 in which said lock member stem is secured to said plate adjacent the aperture in said plate.

4. A jig according to claim 1 in which said first groove extends from top to bottom of said head.

5. A jig according to claim 1 in which said resilient means comprises a toroidal elastomeric member surrounding said stem above said washer and said washer has an enlarged portion above said elastomeric member.

6. A jig according to claim 1 in which said resilient means comprises a spring around said stem and which further comprises an enlarged portion on said stem above said spring restraining upward movement of said spring.

7. A jig according to claim 1 in which said stem has an enlarged portion at its upper end formed with a downwardly opening annular groove and said resilient means is at least partially in said annular groove.

8. A jig according to claim 1, in which said liner has a first flange at one end, a removable second flange at the opposite end and detachable means for securing said removable flange to said liner, said flanges fitting flush against opposite faces of said plate surrounding the aperture in said plate.

9. A jig according to claim 8 in which said lock member stem is secured to one of said flanges.

10. A jig comprising an apertured plate, a slip removable bushing insertable and removable relative to the aperture in said plate, an enlarged diameter head on one end of said bushing, at least one groove on the exterior of said head extending generally parallel to the axis of said bushing, said head provided with a shoulder adjacent said groove, and a lock member having a stem, means for securing said stem adjacent said head, a washer slidable axially of said stem, and resilient means biasing said washer toward said shoulder, said washer fitting in said groove when said head is turned with said groove facing said lock member to permit withdrawal of said bushing from said plate, said washer bearing tightly against said shoulder under force of said resilient means to restrain rotation of said bushing and prevent withdrawal of said bushing from said plate when said head is turned with said shoulder facing said lock member.

11. A lock member for the purpose described comprising a stem, an enlarged end on said stem, a washer axially slidable on said stem having an oblique surface on its underside opposite said enlarged end and resilient means biasing said washer away from said enlarged end.

12. A lock member according to claim 11 which further comprises means on said stem limiting movement of said washer away from said enlarged end.

13. A lock member according to claim 11 in which said resilient member comprises a toroidal elastomeric member surrounding said stem above said washer.

14. A lock member according to claim 11 in which said resilient means comprises a compression spring surrounding said stem above said washer and bearing against said enlarged end.

15. A lock member according to claim 11 in which said enlarged end is formed with an annular recess on its underside facing said washer and said resilient means is at least partially in said annular recess.

16. A lock member according to claim 11 in which the end of said stem opposite said enlarged end is formed with means cooperable with mating means to secure said lock member to said mating means.

No references cited.

WILLIAM W. DYER, JR., *Primary Examiner.*

F. S. HUSAR, *Assistant Examiner.*